United States Patent [19]
Ostlie

[11] Patent Number: 4,706,645
[45] Date of Patent: Nov. 17, 1987

[54] METHOD AND SYSTEM TO PROVIDE THERMAL POWER FOR A POWER PLANT

[76] Inventor: L. David Ostlie, 19540 Patrick Pl., Corcoran, Minn. 55340

[21] Appl. No.: 811,413

[22] Filed: Dec. 20, 1985

[51] Int. Cl.⁴ .............................................. F24H 3/02
[52] U.S. Cl. ............................ 126/810 R; 126/99 R; 60/645; 110/218; 110/224; 110/234
[58] Field of Search ................... 126/110 R; 110/8 R, 110/8 C, 18 R, 109, 165 R, 218, 224, 234, 235, 239, 267, 268, 269, 289, 293; 60/645, 646, 652, 643, 721

[56] References Cited

U.S. PATENT DOCUMENTS

| 408,559 | 8/1889 | Whiting . | |
|---|---|---|---|
| 2,029,576 | 2/1936 | Kolb . | |
| 3,855,950 | 12/1974 | Hughes, Jr. et al. . | |
| 4,372,286 | 2/1983 | Baker | 126/77 |
| 4,474,010 | 10/1984 | Shibuya et al. | 60/645 X |
| 4,502,462 | 3/1985 | Lawrence | 126/77 |
| 4,517,903 | 5/1985 | Richmond et al. | 126/99 R |
| 4,646,713 | 3/1987 | Honigsbaum | 126/79 |

FOREIGN PATENT DOCUMENTS 1088177  9/1960  Fed. Rep. of Germany .

Primary Examiner—Larry Jones
Attorney, Agent, or Firm—Banner, Birch, McKie & Beckett

[57] ABSTRACT

A method and a system for providing thermal power to an electrical power plant wherein substantially whole trees are supplied as fuel without being processed into small woodchips or chunks. The substantially whole trees stored in the drying building to lower their moisture content, and thereafter are transported to a charge pit located adjacent to a combustion chamber. The substantially whole trees are fed into the combustion chamber by a ram feeder and burned therein. The heat created by the combustion is absorbed by a boiler section and in the form of steam it is supplied to a conventional electrical power generator.

37 Claims, 3 Drawing Figures

METHOD AND SYSTEM TO PROVIDE THERMAL POWER FOR A POWER PLANT

TECHNICAL FIELD

The present invention relates to a method and a system for providing thermal power to generate electricity in a power plant.

BACKGROUND OF THE INVENTION

Presently the most cost effective power generation alternative for meeting our future electrical energy needs is the coal burning power plant. Nuclear power is not thought to be a cost effective alternative for the near future because of the high cost of construction. Additionally hydro power is also not available for development in many areas of the country in significant amounts, and the cost of oil and gas fuels for electrical power generation have risen beyond competitive cost levels typical of base loaded generation. Thus, coal burning power plants have become the staple for electric generation, in spite of the high cost of pollution abatement.

A wood burning power plant is another alternative concept. Growing trees for fuel is the purest and cleanest form of capturing and storing solar energy. Also, the source is domestic and 100% renewable. The largest power application using wood fuel in the United States is at the generating plant in Burlington, Vt.

However, the conventional wood burning power plant uses wood fuel processed to woodchips, shreds, pellets, dusts, powder and other forms. Because of the cost of processing trees into appropriate forms for the power plant, conventional wood burning electric generation can not be competitive with other alternative energy sources for power generation such as coal, hydro and nuclear. Furthermore, such processed wood burns rapidly, frequently in suspension as it is injected into the furnace above the grates. In order to keep a constant and steady source of heat supplied to the boiler of the power plant, the processed wood must be supplied to the furnace at a precisely controlled rate.

SUMMARY OF THE INVENTION

The present invention provides a new method and system for providing thermal power to generate electricity in a power plant by using substantially whole trees as fuel in place of conventional processed wood, thus eliminating the need to process the wood to small and uniform pieces or particles.

It is an object of the present invention to provide a new method and system of whole tree burning in a power plant to reduce fuel cost remarkably compared with a conventional processed wood burning power plant.

It is an object of the present invention to provide a new method and system of providing thermal energy to generate electricity in a power plant with overall costs less than a conventional coal plant.

It is an object of the present invention to provide an economical method and system of providing thermal energy to generate electricity in a power plant which virtually eliminates sulfur dioxide emissions typical to conventional fossil fuel power generation.

It is an object of the present invention to provide an economical method and system of providing thermal energy to generate electricity in a power plant which is efficient due to reduced waste heat levels in the exhaust gases.

The present invention provides a system for providing thermal power to an electrical generating power plant which comprises a combustion chamber; drying buildings located adjacent to the power plant and equipped with waste heat driers for storing and drying substantially whole trees prior to combustion to reduce the moisture content of the stored trees; a charge pit located adjacent the combustion chamber; at least one conveyor for transporting the whole trees from the drying building to the charge pit; a ram feeder for feeding the whole trees from the charge pit into a combustion stage of the combustion chamber; a mechanism for supporting the trees in the combustion chamber; air inlets located above and below the support mechanism for supplying air to the combustion chamber; and at least one boiler located above the combustion area in the combustion chamber for absorbing the heat of combustion of trees.

The present invention is also directed to a method for providing thermal energy to an electrical power generating plant by the combustion of substantially whole trees.

The method and system of the present invention exhibit significant advantages, particularly over coal fired power plants. Sulfur dioxide emissions, typical of conventional methods of fossil fuel power generation of which coal is the most competitive, are virtually eliminated.

Plant efficiency is increased due to reduced waste heat levels in the exhaust gases. For example, the generating plant can be costeffectively designed for a higher operating efficiency because of the low to almost nonexistent acid levels in the flue gas. Because of this highly reduced exhaust gas acid content, corrosion problems are greatly reduced allowing heat recovery equipment to be installed to bring the exhaust gas temperatures down to under 150° F. This normally wasted heat becomes usable in the condensate stage heating part of the thermal plant cycle. In efficient large coal burning plants an exhaust gas temperature of 300° F. is typical. The volume of the cold water make-up to the boiler is reduced because of the low ash content, (e.g., ½ to 1% with wood versus 5 to 15% with coal) and lower firing temperatures (e.g., conservatively wood burns at 2600° F. versus coal at 3000° F.), thereby lowering or eliminating the likelihood of molten ash deposit on the furnace or boiler walls. The furnace thus operates much cleaner and does not require the large amount of steam soot blowing typical of coal boilers. Typical sulfur dioxide scrubbing equipment is not required which eliminates the need for high differential pressure ID fans, limestone or lime and ash slurry spray pumps, slurry transfer pumps, mixers etc., all of which consume large amounts of power (approximately 3% of the total unit output).

Capital costs to construct a power plant using the present invention are much lower for a number of reasons.

No measurable sulfur dioxide gas is produced so that there is no requirement for dry or wet flue gas sulfur dioxide scrubbing which is typical of new coal plant requirements. Typical flue gas scrubbing and conditioning equipment costs average from 25% to 40% of the total capital cost of an electric generating plant fired with coal. As a result, on a $500 million power plant there can be from $125 million to $200 million in savings. No coal crushing or pulverizing equipment is required. Lined or sealed coal storage and handling areas are also not needed. Conventional requirements for coal storage require either a clay base liner or synthetic or organic sheet liners such as vinyl or polyethylene.

Finally utilization of the present invention results in much lower operating costs for the power plant.

There are no lime, limestone or reagent costs associated with flue gas scrubbing, and no manpower costs associated with flue gas sulfur dioxide scrubbing. Auxiliary power costs are lower since there is no need for high differential pressure ID fans and no slurry spray or injection pumps associated with $SO_2$ scrubbing. The need for bottom ash clinker grinders, ash pond transfer or return pumps is also eliminated. No fly ash or bottom ash ponds are required since whole tree ash contents vary from ½ to 1% whereas coal averages around 10% ash. Such lower ash contents, which are absent of coal ash clinkering, can be handled dry and used as a soil supplement. It is presently not treated as a hazardous waste because of its low to nonexistent levels of heavy metals and sulfur compounds.

Further objects, features and other aspects of this invention will be understood from the following detailed dscription of various embodiments of this invention referring to the annexed drawings.

DETAILED DESCRIPTION OF THE INVENTION

Figure 1:
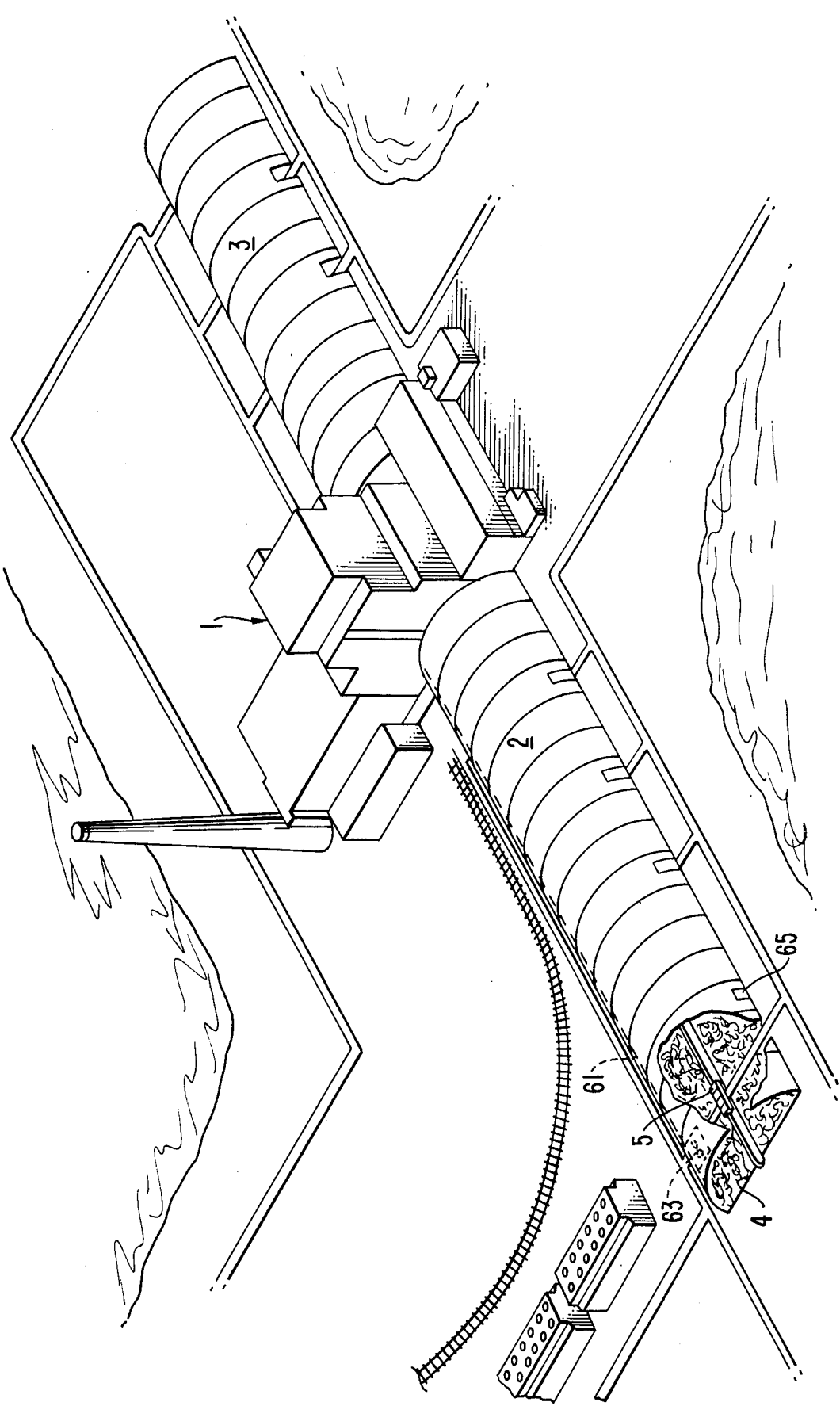
FIG. 1 is a schematic drawing of an external appearance of one embodiment of a power plant using the present invention, partially broken away to indicate an internal view of a drying building.

Referring now to FIG. 1, an external appearance of one embodiment of a power plant using a substantially whole tree burning system in accordance with the present invention is shown. The terms "substantially whole trees", "whole trees", or simply "trees", when used in reference to the combustion fuel used in the power plant, are used herein to differentiate the fuel from typical wood fuel that has been processed quite extensively to dust, shreds, chips, pellets, powders and the like, and means that the wood is used in the form substantially as it was cut in the forest. The terms, of course, include wood that has been delimbed or slightly load trimmed for purposes of transport; has been broken during transport to the plant or during delivery to the furnace; or has undergone minor sectioning, such as into halves or thirds. Typically, the trees would be relatively large, for example, an average of five hundred pounds or greater and fourty to seventy feet long. Trees with relatively large diameters, for example, six inches or greater are preferred. Such larger trees can burn in a manner to provide relatively steady and slow gasification, i.e., gases which are subsequently burned above the trees. This gasification occurs at a lower temperature than would be possible if very small trees were used, particularly if a relatively large bed or pile of the trees is formed in the furnace. Any type of tree or mix of a variety of different trees are believed suitable for use in the present method. Scrub trees and forest cull wood could be used. However, green conifers or evergreens would be less desirable because of the handling problems associated with dry needles. A plant can be designed to have almost any generating capacity, including the 400 Megawatt plant described herein. A power plant larger than 10 Megawatt is economically preferable for a whole tree burning system.

Power plant building 1 located in the center includes a furnace, a boiler and other equipment to feed whole trees to the furnace which will be explained hereinafter. Power plant building 1 also includes a conventional electric generator which converts thermal power into electricity, e.g., generating steam to drive a turbine.

Drying buildings 2 and 3 are located symmetrically on the both sides of and adjacent to power plant building 1. Whole trees 4 carried to the plant for fuel are stored in drying buildings 2 and 3, substantially as cut and transported from the forest, for the purpose of reducing moisture contained in the whole trees to make them appropriate for combustion.

Drying buildings 2 and 3 are equipped with dryers, which supply dry atmospheric air to drying buildings 2 and 3. The dryers are supplied with warm water typically from 80° F. to 120° F. using condenser waste heat from power plant building 1, for example, through piping shown diagrammatically as dash line 61 in FIG. 1. The dryers include a plurality of fans, one of which is shown as 63, along one side of the base of the drying buildings. Fans 63 draw outside air into the buildings and pass the air over heat exchangers along piping 61. The heated air passes transversely across the buildings and through the stored logs, and exits through openings 65, one of which is shown in building 2, along the opposite base of buildings 2 and 3. Because heat exchange systems in a typical power plant cannot convert all the thermal energy created by the furnace/boiler system into electricity, the unconverted remaining thermal energy can be used in part for drying whole trees 4.

Typically, in this embodiment, whole trees 4 are stored for 30 days in drying buildings 2 and 3. It is preferable that the relative humidity in drying buildings 2 and 3 is maintained at equal to or less than 35%. In a 400 Megawatt power plant each drying building could be 3000 feet in length with a storage area of approximately 5 acres.

Conveyor 5 is installed within drying buildings 2 and 3, and extends into the area of the furnace in power plant building 1. Conveyor 5 conveys whole trees 4 from outside into a proper location in the drying building for storage or from the drying buildings to the furnace area in power plant building 1 for supplying the trees to the furnace.

The whole trees are not processed into wood chips, shreds, pellets, dusts, powder or other forms as used in a conventional wood burning power plant. The whole trees are, substantially as they are delivered, fed into the furnace as fuel. The wood fuel in the present invention contains substantially whole trees, preferably with an average individual weight greater than about 500 pounds.

Figure 2:
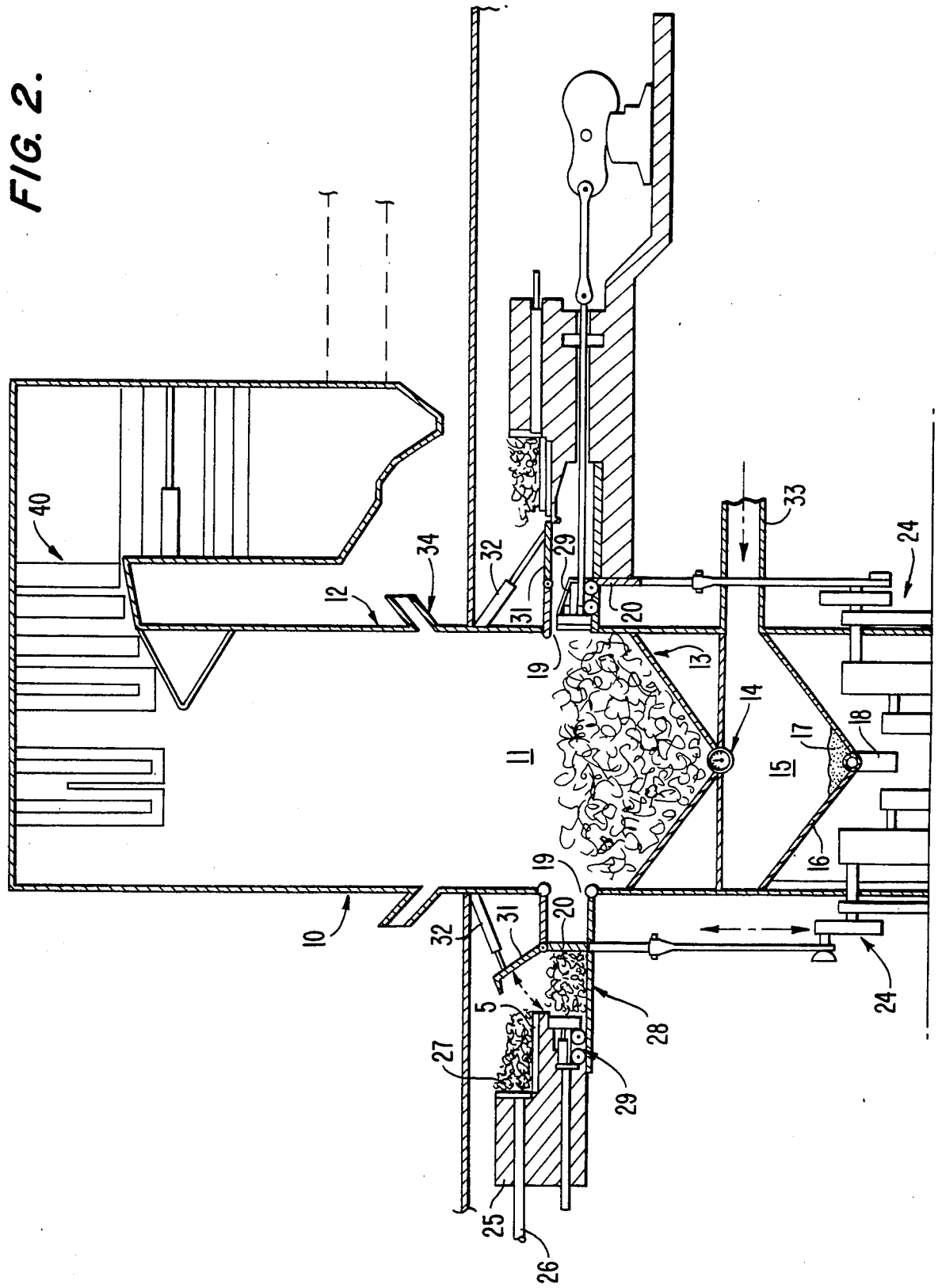
FIG. 2 is a cross-sectional drawing of a furnace, a boiler and fuel delivery equipment in a power plant using the present invention.

Referring to FIG. 2, which indicates a furnace/boiler system of the present invention, a combustion chamber 10 has two-stage combustion areas. Initial combustion stage 11 is formed by furnace wall 12, lined in a conventional manner and a downwardly-sloped wood support structure, such as a conventional water cooled grate 13. Depending on the size of the furnace, the sloped grate or support structure will vary from a steep incline to a flat grate as is necessary to maintain a relatively even fuel charge depth. Substantially whole trees 4 are fed onto grate 13 to form a bed of combustion material burned in initial combustion stage 11. The burning of the bed of trees produces gases which are subsequently burned above the bed of trees at a higher temperature than the burning trees. A central opening 14 is formed at the bottom of grate 13 and small char created by combustion of whole trees in initial combustion stage 11 falls through central opening 14 and openings in grate 13 into a second combustion stage 15. Second combustion stage 15 is formed by a portion of furnace wall 12 and a downwardly sloped bottom wall 16. A central opening 17 at the center of bottom wall 16 is connected with an ash discharge 18. Char and ash which fall from central opening 14 burn in second combustion stage 15, and unburned ash is collected at the center of bottom wall 16. Ash is then taken to the outside of the furnace through central opening 17 and ash discharge 18 for disposal.

An under fire or primary air inlet 33 is installed in furnace wall 12 of second combustion stage 15 beneath water cooled grate 13 of initial combustion stage 11. Air at approximately 650° F., during typical operation, is supplied in the horizontal direction through the air inlet 33. The air supplied through inlet 33 controls the temperature at which the bed of trees 4 is supported on grate 13 burns. By raising or lowering the flow rate, and/or secondarily the temperature of the air, the combustion rate of the bed of trees 4 can be raised or lowered. The bed of trees 4 is at least three feet high above the bottom of grate 13, and preferably at least six feet high. A pair of over fire or secondary air inlets 34 are also installed symmetrically in furnace wall 12 above initial combustion stage 11. Air controlled up to approximately 650° F., during typical operation, is supplied into initial combustion stage 11 in a movable downwardly slanted direction so that air is effectively mixed with other gases and supplied to the area above the wood bed to control the temperature at which the released gases burn. The flow rate and temperature of the air supplied through inlets 33 and 34 is controlled in a conventional manner. Preferably the temperature of burning fuel in initial combustion stage 11 is around 2000° F. and the temperature of the burning gases is preferably around 2600° F.

A pair of tree charge openings 19 are symmetrically formed in furnace wall 12 at the area of initial combustion stage 11 to feed substantially whole trees into the furnace. Each tree charge opening 19 has a gate 20 which opens and closes tree charge opening 19. The motion of gate 20 is operated by a gate lifter 21, which comprises, respectively, crank 22 and rod 23 which in turn are connected to drive means 24. As drive means 24 are actuated, gate lifters 21 move gates 20 upward and downward.

Substantially whole trees are carried by drag conveyors 5 from drying buildings 2 and 3 to the furnace in the vicinity of each of tree charge openings 19. Conveyor 5 brings whole trees 4 to the furnace at a level higher than tree charge opening 19. A charge pit feeder 25 removes whole trees from drag conveyor 5. Charge pit feeder 25 has an extendable rod 26 and a plate portion 27 by which whole trees on conveyor 5 are pushed in the horizontal direction transverse to the moving direction of conveyor 5 so that whole trees drop off the conveyor, into a charge pit 28 formed adjacent to tree charge opening 19. A charge pit 28 is located on each of two opposite sides of the furnace. One side of charge pit 28 is defined by gate 20 and the other side is defined by a terminal plate of a ram feeder 29. The upper opening of charge pit 28 is a tree delivery inlet 30 which has a lid 31. Lid 31 is rotatably supported by a horizontally extended portion of furnace wall 12 defining tree charge opening 19. Tree delivery inlet 30 is opened or closed by an operating actuator 32 attached to lid 31.

When whole trees 4 are fed into charge pit 28 from conveyor 5, tree delivery inlet 30 is open but gate 20 is closed and ram feeder 29 is at the most recessed position from tree charge opening 19. After charge pit 30 is filled with substantially whole trees 4, tree delivery inlet 30 is closed, gate 20 is opened and ram feeder 29 is actuated to push the whole trees from charge pit 28 into initial combustion stage 11 through tree charge opening 19. Thus, whole trees are delivered in batches from charge pit 28 to the furnace.

Whole trees 4 are supplied into the furnace alternately from a tree charge opening on each side of the furnace so that the whole area of initial combustion stage 11 is evenly used for combustion. Any conventional mechanism can be used to initiate the combustion of the trees. Also, once combustion has started, the already burning trees function as the mechanism for initiating the combustion of trees fed into the furnace.

Boiler sections 40 are installed above combustion chamber 10 so that the thermal energy created by the combustion of the substantially whole trees, particularly the combustion of the gases produced during gasification of the trees, efficiently produces steam. Steam thus produced is led to power generators, not shown in FIG. 2. Power generators convert thermal energy of steam into electrical energy. Details of boiler sections and power generators are known in the prior art and not described here. Other systems of converting thermal energy to electrical energy could also be used.

Figure 3:
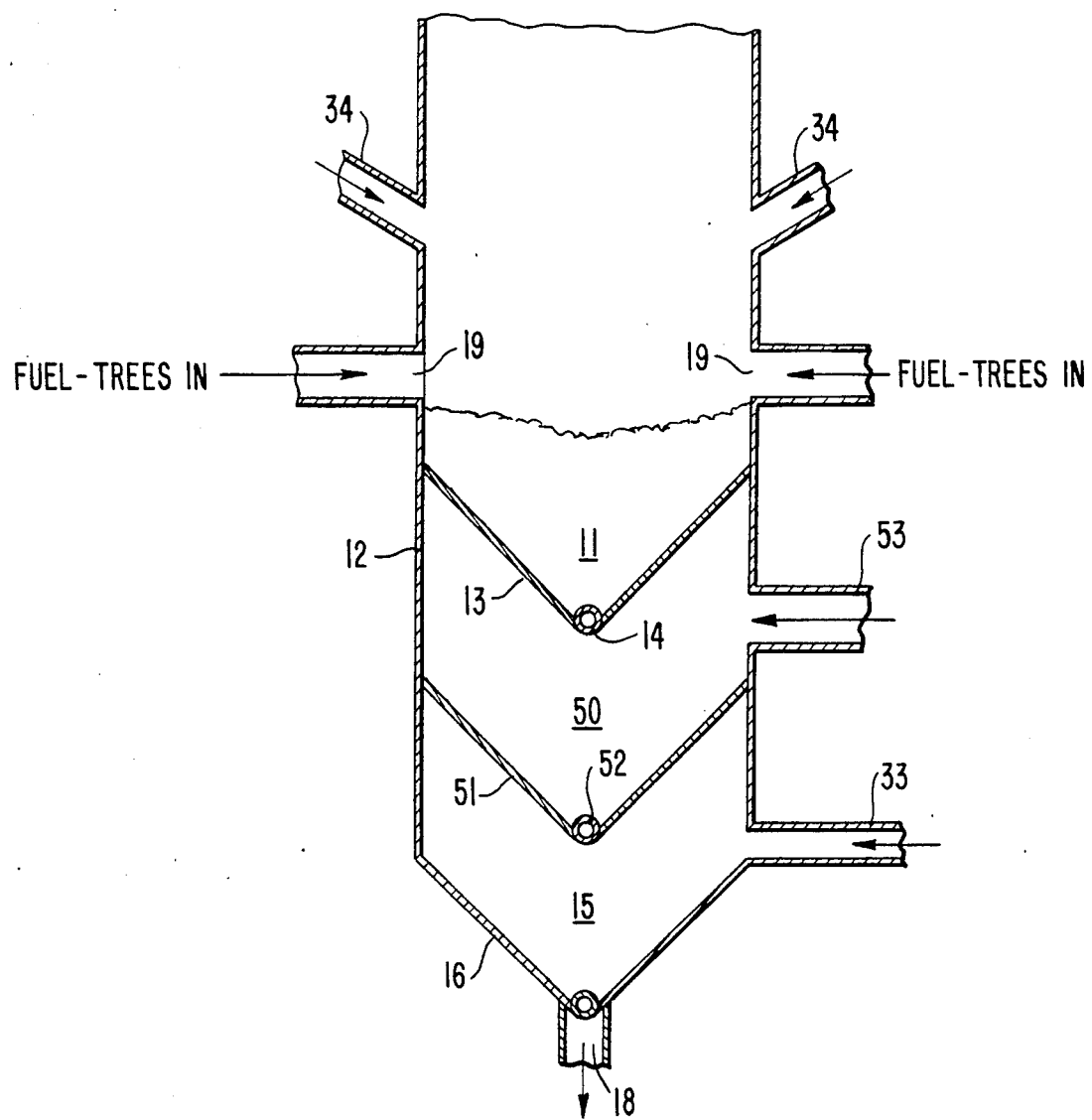
FIG. 3 is a schematic drawing illustrating a three-stage combustion chamber of the present invention.

Although the embodiment shown in FIG. 2 has two combustion stages, i.e., initial combustion stage 11 and second combustion stage 15, it is possible to have three combustion stages. FIG. 3 illustrates the conceptual relationship of three combustion stages. Intermediate combustion stage 50 is added between initial combustion stage 11 and combustion stage 15. Intermediate combustion stage 50 is surrounded by furnace wall 12 and has a downwardly sloped grate 51 with a central opening 52. Air inlet 53 is also provided in furnace wall 12 horizontally to supply air in intermediate combustion stage 50.

In the three-stage combustion chamber design, central opening 14 and the holes in grate 13 of initial combustion stage 11 are sufficiently large to allow char created from combustion of substantially whole trees to fall into intermediate combustion stage 50. In stage 50 char is burned and thus creates smaller char and ash particles which fall through grate 51 and its central opening 52 into combustion stage 15 where these are completely burned into ashes.

Preferable temperatures of burning fuels in each of the stages are approximately 2000° F. in initial combustion stage 11, 1500° F. in intermediate stage 50 and 650° F. in combustion stage 15. Burning gases above initial combustion stage 11 occurs at approximately 2600° F.

The whole tree burning power plant reduces fuel cost significantly compared with a conventional processed wood burning power plant, because the present invention eliminates the necessity of processing wood as required in the conventional plant. If the plant of the present invention is sited in a location where long distance transportation of whole trees is not necessary, fuel cost can be reduced to less than a half of the conventional processed wood burning plant. In addition, the substantially whole trees of the present invention do not have to be supplied to the furnace at a precisely metered rate, such as processed wood. Rather, a bed of burning substantially whole tres supplies a steady, constant supply of gas and this gas supply can be readily controlled by controlling the temperature of the tree bed combustion so that the trees can be supplied periodically in batches. Also, the larger or higher the bed of trees is made, the lower the temperature at which the bed can be burnt to supply sufficient gas.

The whole tree burning system of the present invention is also economical in comparison to a coal burning power plant. Because a wood burning power plant virtually eliminates sulfur dioxide emissions typical of fossil power generation, it requires much less plant capital costs and operating costs. Typical flue gas scrubbing equipment, indispensable for a coal burning plant, are not required in a whole tree burning system.

Due to the savings in fuel cost in combination with less capital and operating costs of wood burning plant compared with coal burning power plant, the whole tree power plant would be a most cost effective alternative.

Naturally, it should be understood that changes can be made to the disclosed embodiment. Thus, it will be obvious to one of ordinary skill in the art that numerous modifications may be made without departing from the true spirit and scope of the invention, which is to be limited only by the appended claims.

I claim:

1. A method for providing thermal power to generate electricity in a power plant comprising:
    delivering substantially uncut and untrimmed whole trees into a combustion chamber;
    burning said substantially whole trees in said combustion chamber to generate heat; and
    absorbing the heat of combustion of said trees in a device for providing power to an electrical power generator.

2. A method for providing thermal power to generate electricity in a power plant comprising:
    delivering substantially uncut and untrimmed whole trees having a relatively low level of moisture for combustion into a combustion chamber;
    burning said substantially whole trees in said combustion chamber to generate heat;
    controlling the air content of said combustion chamber with at least two air inlets; and
    absorbing the heat of combustion in a boiler section of a power steam generator in the power plant.

3. A method in accordance with claim 1 or 2 wherein said combustion chamber includes a plurality of combustion stages.

4. A method in accordance with claim 3 including reducing the moisture of said trees prior to combustion by storing the trees for a period of time in a drying building.

5. A method in accordance with claim 4 wherein an atmosphere is maintained in said drying building having a level of relative humidity of less than about 35%.

6. A method in accordance with claim 5 including locating said drying building adjacent to the power plant.

7. A method in accordance with claim 6 wherein the moisture of said trees is lowered by supplying condenser waste heat from the power plant to said drying building.

8. A method in accordance with claim 1 or 2 wherein the delivered substantially whole trees have an average individual weight greater than about 500 pounds.

9. A method in accordance with claim 1 or 2 including generating at least 10 mega watts power in the power plant.

10. A method in accordance with claim 1 or 2 wherein said substantially whole trees are delivered to said combustion chamber in batches from at least one charge pit.

11. A method in accordance with claim 10 including locating a charge pit on each of two opposite sides of said combustion chamber.

12. A method in accordance with claim 6 including transporting said substantially whole trees from said drying building to a charge pit and delivering said substantially whole trees to said combustion chamber in batches from said charge pit.

13. A method in accordance with claim 12 wherein said delivery from said charge pit is accomplished by pushing said trees from said charge pit into said combustion chamber with a ram feeder.

14. A method in accordance with claim 2 or 12 wherein said substantially whole trees are piled in said combustion chamber to form a bed of trees sufficient to supply a steady, constant supply of gas for combustion.

15. A method in accordance with claim 1 or 2 wherein the burning of said substantially whole trees occurs in three stages with air inlets supplying air to the combustion chamber at three vertically spaced locations.

16. A method for providing power to generate electricity in a power plant comprising:
    storing substantially uncut and untrimmed whole trees prior to combustion in a drying building adjacent to the power plant;
    drying the trees using condenser waste heat from the power plant to lower the moisture content of the trees prior to combustion;
    transporting the trees by conveyor to an area adjacent to a combustion chamber;
    delivering the trees in batches into the combustion chamber;
    burning the trees in the combustion chamber to generate heat;
    controlling the temperature of combustion of the substantially whole trees;
    controlling the flow rate of air below the burning trees; and
    absorbing the heat of combustion in boiler sections of a power steam generator located above said combustion chamber.

17. A method in accordance with claim 15 including forming a bed of said substantially whole trees in said combustion chamber sufficient to supply a steady, constant supply of gas for combustion.

18. A system for providing power to an electrical generating power plant comprising:
    means for defining a combustion chamber within which substantially uncut and untrimmed whole trees are received for burning;
    conveyor means for delivering said substantially whole trees for combustion into said combustion chamber; and heat absorbing means for absorbing the heat of combustion of said substantially whole trees, said heat absorbing means being adapted to be operatively connected to means for converting the absorbed heat into electrical power.

19. A system for providing power to an electrical generating power plant comprising:
   means for defining a combustion chamber within which substantially uncut and untrimmed whole trees are received for burning;
   conveyor means for delivering said substantially whole trees for combustion into said combustion chamber;
   means for supporting said substantially whole trees in said combustion chamber during combustion;
   air control means for controlling the flow rate of air into said combustion chamber including at least two air inlets;
   temperature control means for controlling the temperature at which said substantially whole trees burn including at least one of said air inlets for controlling the flow rate of air below said supporting means; and
   heat absorbing means for absorbing the heat of combustion of said substantially whole trees including at least one boiler adapted to be connected to means for converting the absorbed heat into electrical power.

20. A system in accordance with claim 18 or 19 including means for reducing the moisture content of said substantially whole trees prior to delivery to said combustion chamber.

21. A system in accordance with claim 20 wherein said means for reducing the moisture content of said substantially whole trees includes a drying building for storing the trees in an atmosphere adapted to reduce their moisture content.

22. A system in accordance with claim 21 wherein said drying building is located adjacent to the power plant.

23. A system in accordance with claim 22 wherein said means for reducing the moisture content of said substantially whole trees include means for conducting condenser waste heat from the power plant to said drying building.

24. A system in accordance with claim 18 or 19 including at least one charge pit located adjacent to said combustion chamber for receiving batches of said substantially whole trees from said conveyor means through a tree delivery inlet.

25. A system in accordance with claim 24 including means for loading said substantially whole trees from said charge pit into said combustion chamber through at least one tree charge opening in a wall of said combustion chamber.

26. A system in accordance with claim 25 wherein said means for loading the trees from said charge pit into said combustion chamber includes at least one ram feeder.

27. A system in accordance with claim 26 including means for opening and closing said tree charge opening in the wall of said combustion chamber.

28. A system in accordance with claim 27 including means for opening and closing said tree delivery inlet to said charge pit.

29. A system in accordance with claim 28 wherein said means for opening and closing said tree delivery inlet is coordinated with said means for opening and closing said tree charge opening so that said tree delivery inlet is open when said tree charge opening is closed and vice versa.

30. A system in accordance with claim 19 wherein said combustion chamber has a plurality of combustion stages.

31. A system in accordance with claim 19 wherein said supporting means is a water cooled grate.

32. A system in accordance with claim 31 including means for collecting ash.

33. A system in accordance with claim 32 wherein said means for collecting ash includes at least one ash pit located beneath said water cooled grate.

34. A system in accordance with claim 31 wherein at least one of said air inlets includes an air inlet located beneath said water cooled grate.

35. A system in accordance with claim 34 wherein at least one of said air inlets includes an air inlet above said water cooled grate.

36. A system for providing power to an electrical generating power plant comprising:
   means for defining a combustion chamber;
   at least a drying building located adjacent to the power plant and equipped with driers for storing substantially uncut and untrimmed whole trees prior to combustion to reduce the moisture content of the stored substantially whole trees;
   a charge pit located adjacent to said combustion chamber;
   at least one conveyor for transporting the substantailly whole trees from said drying building to said charge pit;
   a ram feeder for pushing the substantially whole trees from said charge pit into said combustion chamber;
   a water cooled grate for supporting the substantially whole trees in said combustion chamber;
   air inlets located above and below said water cooled grate for supplying air to said combustion chamber; and
   at least one boiler for absorbing the heat of combustion of the substantially whole trees located above said combustion chamber.

37. A system in accordance with claim 36 wherein said driers include means for conducting condenser waste heat from the power plant to said drying building and means for passing air over said last-mentioned means and through the substantially whole trees stored in said drying buildings.

* * * * *